Dec. 15, 1942.   B. W. HUBBARD   2,305,164
VULCANIZED OIL COMPOSITION
Filed March 25, 1938
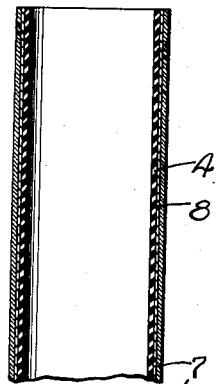
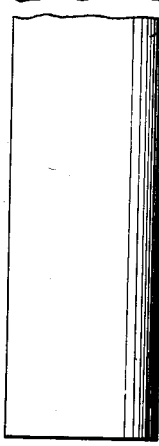
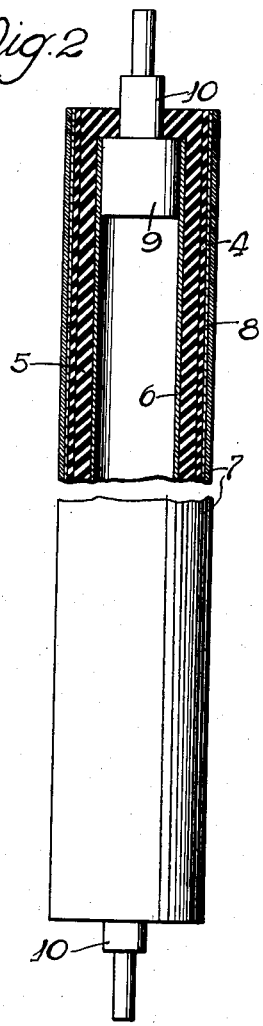
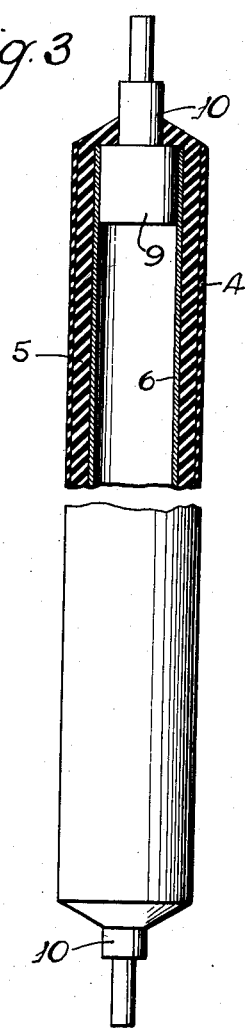
INVENTOR
Bruce W. Hubbard
By Parker, Carlson, Pitzner & Hubbard
ATTORNEYS Patented Dec. 15, 1942

2,305,164

UNITED STATES PATENT OFFICE 2,305,164

VULCANIZED OIL COMPOSITION

Bruce W. Hubbard, Oak Park, Ill., assignor to Ideal Roller & Manufacturing Company, Chicago, Ill., a corporation of Illinois Application March 25, 1938, Serial No. 198,036

4 Claims. (Cl. 260—23)

This invention relates to compositions forming the ink-carrying surfaces of printers' rolls and the like and known to the trade as vulcanized oil. While such compositions are substantially unaffected by the action of ordinary printing and lithographic inks and possess the degree of softness desired in ink-carrying surfaces for printing presses, they are relatively brittle and have a low tensile strength. As a result, the surfaces are apt to become split or prices thereof are torn out in ordinary service use.

The primary object of the invention is to prolong the service life of vulcanized oil compositions when used as ink-carrying surfaces and to enlarge the range of usefulness of such material by increasing substantially the tensile strength and elasticity of the material.

A more detailed object is to provide a vulcanized oil composition having incorporated therein a substantial quantity of a material possessing the properties of rubber and acting to reinforce and toughen the vulcanized oil.

The invention also resides in the novel character of the process by which a homogeneous mixture of the rubber-like material and vulcanized oil is formed.

In the drawing, Figures 1 and 2 are elevational views partially in section illustrating successive steps in the process of forming a printers' roll having an ink-carrying surface composed of the improved vulcanized oil composition.

Fig. 3 is an elevational view partially in section of a substantially finished roll.

The present invention is based upon my discovery that certain rubber-like materials are substantially inert to certain agents by which oils may be vulcanized or at least react with such agents much more slowly than do the oils used in vulcanized oil compositions. I take advantage of this property to enable the oil vulcanizing agent to be dispersed thoroughly in a homogeneous mixture of oil and a substantial portion of rubber material whereby to effect complete polymerization of the oil and enable the polymerized mass to take the form of a mold. To provide for optimum toughness of the reaction product, the invention also provides for vulcanization of the rubber material.

The vulcanizing agent employed will depend upon the character of the rubber material selected. Various agents such as sulphur chloride, sulphur bromide, sulphur thiocynate, and dithiocyanogen possess the property of reacting relatively slowly with certain kinds of rubber materials. Since sulphur chloride is commonly employed in polymerizing oils, it is preferably the agent used in the present instance.

In view of the preferred use of one of the vulcanizing agents enumerated above, the reinforcing or toughening ingredient is selected from the group of so-called synthetic rubbers or rubber substitutes. A material manufactured by E. I. du Pont de Nemours & Company and sold under the trade names of Duprene or neoprene is preferably employed not only because it reacts very slowly with ordinary oil vulcanizing agents but also because it possesses numerous other properties which are utilized to advantage in the present invention. The chemical composition of Duprene or neoprene is well known, and it may be characterized as a chloroprene rubber comprising a chloroprene derivative of mono-vinyl-acetylene. It is sold in various types representing different stages of polymerization and purification.

The amount of synthetic rubber will ordinarily be less than the oil and will increase with the degree of toughness desired. A product having the toughness and tensile strength desired in an ink-carrying surface may, for example, be formed by employing approximately twenty-five per cent by weight of the chloroprene rubber. If desired, a further increase in strength may be obtained by increasing the amount of the rubber material in a manner later to be described.

The addition of chloroprene rubber in the amounts contemplated results in a substantial thickening of the vulcanizable oil. To allow ample time for dispersion of the vulcanizing agent throughout the synthetic rubber and oil mixture and for the mixture to take the form of a mold, the invention contemplates a substantial retardation of the reaction between the oil and the vulcanizing agent. This may be accomplished by employing vulcanizable oils having only a limited degree of unsaturation or affinity for the vulcanizing agent. The oils having this characteristic are composed largely of esters of unsaturated fatty acids which have only one unsaturated carbon linkage and no hydroxy radical. Among these oils are corn and soya bean oil which are composed mainly of esters of oleic acid, the latter having only one double bond carbon linkage. The oil ingredient may also comprise an ester of a higher hydroxy fatty acid in which the hydroxyl group is replaced by a radical from a group including chlorine or the acetyl, formyl or carbonate radicals. Acetylated castor oil is an example of an ester of the latter group.

While specific proportions are not important, it has been found that the desired elasticity and tensile strength may be obtained by employing twenty-five per cent by weight of chloroprene rubber, known to the trade as Type E-neoprene, 0.25 per cent of zinc oxide, 2.5 per cent of magnesium oxide, 32.51 per cent of corn oil, 32.51 per cent of soya bean oil, and 7.23 per cent of a previously heated mixture composed of 3.2 pounds of magnesium oxide and 100 pounds of linseed oil. The oil may be vulcanized by adding four cubic centimeters of sulphur chloride per ounce of the mixture.

When, as in the above formula, substantially more than ten per cent of synthetic rubber is used, it is desirable, in order to facilitate manufacture, to thin the mixture before vulcanization with a volatile liquid in which the rubber material is soluble. Chloroprene rubber dissolves readily in aromatic hydrocarbons, particularly benzole, which preferably is employed as the thinner in the above formula. With the latter, the desired thinning is obtained by using 40 parts of benzol to 25 of the synthetic rubber.

In compounding, the powdered ingredients are first mixed thoroughly with the synthetic rubber in a suitable rubber mill, and enough oil is milled into these ingredients to permit of further mixing in a beater type mixer. The benzol is added to form a synthetic rubber cement. Finally, the remainder of the oil is added slowly to the cement so as to form a thoroughly homogeneous mixture.

When the sulphur chloride is added to the diluted mixture, the vulcanizing action takes place at a rate sufficiently slow to enable the sulphur chloride to be dispersed thoroughly through the mixture and the latter to be poured into a mold and take the form thereof before solidification occurs. Such slowness of the polymerizing reaction is due to the substantially saturated character above referred to of the oils employed. Since the chloroprene rubber is much less reactive to the vulcanizing agent than are the oils, the latter become polymerized effectively by the addition of the agent in a quantity which imparts the proper degree of softness to the vulcanized oil.

The zinc oxide in the above formula is added as an accelerator to effect vulcanization of the chloroprene rubber and thereby increases its toughening action in the final product. The presence of a zinc compound, which reacts with the hydrogen chloride liberated during vulcanization of the oil, produces zinc chloride which accelerates curing of the chloroprene rubber. This tendency may be offset and the polymerization retarded to the proper degree by the addition of magnesium oxide in the approximate quantity given. This ingredient acts as an inhibitor initially when the temperature of the mixture is low, but under the heat developed during polymerization of the oil, the magnesium oxide performs the function of accelerating vulcanization of the chloroprene rubber.

The final product is a homogeneous solid in which the rubber-like toughening material is dispersed uniformly. It is soft and pliable, may be bent sharply and stretched substantially without breaking. The strength increases with the age of the product, presumably due to continued slow curing of the chloroprene rubber. After proper aging, the tensile strength is more than 325 pounds per square inch which compares with a strength of about 80 pounds per square inch for ordinary vulcanized oil.

Rolls or other ink carriers having surfaces composed of the improved vulcanized oil compounds may be formed by the method illustrated in the drawing and more fully disclosed in Patent No. 1,318,520. This method, in the case of printers' rolls of the type shown in Fig. 3, involves the formation of an outer layer or shell 4 and casting of a suitable core 5 within the shell and around a tube 6 which constitutes a part of the roller shaft. Plugs 9 secured in opposite ends of the tube have projecting ends 10 through the medium of which the finished roller may be rotatably supported.

The shell is formed in a centrifugal casting operation as described in the aforesaid patent. This involves charging the synthetic rubber and oil mixture after addition of the sulphur chloride charge into a rotating mold 7 which has previously been lined with a thin layer 8 of wax. Rotation of the mold is continued until vulcanization is complete. During and after vulcanization of the oil in the centrifugal casting operation, the solvent which is added for the purpose previously described volatilizes rapidly without affecting the character of the final composition.

The core 5 is cast within the solidified shell while the roller shaft is centered properly within the mold. Usually, the core is made of a softer vulcanized oil material than the shell. In the casting operation, the core 5 and the shell 4 become firmly bonded together and the core adheres properly to the coating of pitch or the like usually applied to the tube 6.

After casting of the core, the roller may be removed from the mold by heating the latter to a temperature sufficient to melt the wax lining 8. Then, the ends of the shell and core are beveled as shown in Fig. 3.

The present composition is also adapted to form the surface of other ink-carrying members such, for example, as the blankets used in offset printing. For this use, a layer of the vulcanized oil composition would be formed by centrifugal casting and attached in any suitable manner to a flexible base or carrier such as a sheet of rubberized fabric, oil treated fabric, paper, or metal.

Some improvement in the tensile strength of the vulcanized oil product may be obtained by increasing the proportion of synthetic rubber employed, for example, up to thirty-five per cent. To do this, it would be desirable, in order to facilitate handling of the material, to increase the amount of thinner used or to employ higher speeds during centrifugal casting.

While I have disclosed herein vulcanized oil compositions which are especially suited for use as the surface layer of printers' inking rolls and which are composed of certain preferred ingredients, it is to be understood that I do not intend to limit the invention by such disclosure but aim to cover other uses and all variations in kinds and proportions of ingredients falling within the spirit and scope of the invention as expressed in the following claims.

I claim as my invention:

1. The process of producing a vulcanized oil composition which comprises mixing an unvulcanized vulcanizable oil and a smaller amount of chloroprene rubber to form a homogeneous fluid mixture, and then subjecting the fluid mixture to the action of an agent which will vulcanize said oil but is substantially less reactive with said chloroprene rubber.

2. The process of producing a vulcanized oil composition which comprises mixing an unvulcanized vulcanizable oil, a lesser amount of a chloroprene rubber compound and a volatile solvent to form a homogeneous fluid mixture, and adding to the thinned mixture an agent for vulcanizing the oil therein.

3. The process of producing a vulcanized oil composition which comprises mixing an unvulcanized vulcanizable oil and a lesser amount of a chloroprene rubber compound to form an unvulcanized homogeneous free-flowing fluid mixture and then dispersing in said mixture a sulphur containing cold-cure vulcanizing agent for said oil.

4. A composition comprising a vulcanized oil and a lesser amount of chloroprene rubber uniformly dispersed throughout said vulcanized oil to form a homogeneous solid, the amount of said vulcanized oil being sufficiently greater than the amount of said rubber that the two, when mixed in the unvulcanized state, will form a homogeneous fluid.

BRUCE W. HUBBARD.